United States Patent [19]

Cohen et al.

[11] 3,924,823

[45] Dec. 9, 1975

[54] CARTRIDGE DRIVE

[75] Inventors: William D. Cohen, Huntington; John J. Darcy, Brentwood, both of N.Y.

[73] Assignee: Redactron Corporation, Hauppauge, N.Y.

[22] Filed: June 26, 1974

[21] Appl. No.: 483,412

[52] U.S. Cl. .................................... 242/198; 360/96
[51] Int. Cl.[2] G03B 1/04; G11B 15/32; G11B 23/04
[58] Field of Search ............................ 242/197-200, 242/192, 201; 360/93-96

[56] References Cited

UNITED STATES PATENTS

| | | | |
|---|---|---|---|
| 2,668,059 | 2/1954 | Roberts | 242/201 |
| 3,385,534 | 5/1968 | Staar | 242/198 |
| 3,593,946 | 7/1971 | Shardlow | 242/192 |
| 3,764,089 | 10/1973 | Yoshida | 242/198 |
| 3,807,653 | 4/1974 | Van Der Maaden | 242/198 |
| 3,846,834 | 11/1974 | Nakamori | 360/93 |

*Primary Examiner*—Leonard D. Christian
*Attorney, Agent, or Firm*—Hane & Baxley

[57] ABSTRACT

A tape drive for a cartridge combines a cassette insertion means, positive positioning means and reject means in a compact and simple package which also includes circuit boards carrying the components.

10 Claims, 9 Drawing Figures

CARTRIDGE DRIVE

This invention pertains to tape decks and more particularly to a tape deck for the driving of tape cartridges.

While the art of reel to reel tape decks have been in existence for many years and have been highly refined, there has always been a need for less expensive and complex drives. Several years ago there became available the Norelco cassette. Such a cassette became an immediate success in the home entertainment field and showed some promise of becoming a storage medium in the data processing field. In fact, for some data processing applications it is presently being used successfully. However, that success created the demand for a more reliable and durable cassette with greater information storage capacity. Recently this demand has been met by a cartridge marketed by the Minnesota Mining and Manufacturing Company. This so-called 3M cartridge has been specifically designed for the data processing industry and has the following desirable features:

1. A rectangular package having an upper transparent plate through which may be seen a closed belt drive between a driving puck and the reel spools;
2. Left and right side channels leading to wide notches;
3. A manual tape-erase interlock;
4. An optical means for end-of-tape sensing;
5. A door giving on to the magnetic head access area of the tape; and
6. Precise machining of parts.

It is an object of the invention to provide a simple, relatively inexpensive and compact deck which easily handles the above-mentioned cartridges.

Generally, the deck slidably accepts the cartridge in side guides. The cartridge, upon insertion, first cams open the tape access door.

The near portion of the cartridge is urged upwardly into contact with the guides by an underlying spring-loaded ball. Upon completion of insertion against a pair of stops, the far portion is biased both upwardly to the side guides and inwardly against the stops by a pair of spring-loaded roller arms that utilize notches in the cartridge as detents. A first switch contacted by the far edge of the cartridge is a final position interlock. A second switch contacts the tape-erase interlock in the safety position only. An end-of-tape sensor straddles the cartridge optical means. A magnetic head contacts the tape.

Finally, the drive capstan of the tape drive motor is contacted slightly before final cartridge position. The motor pivotally mounted and rotationally biased towards the capstan by a spring, turns into the vertical as the puck of the cartridge pushes the driving capstan. This arrangement sets the driver contact pressure.

To extract the cartridge, a release lever urges the cartridge rearward forcing the roller arms out of the detents and the cartridge is free for manual withdrawal.

The deck mounts the servo control printed circuitry boards, electronic components and connecting harnesses. Further, the deck is combined with a panel-mounted front escutcheon.

Other objects, the features and advantages of the invention will be apparent from the following detailed description when read with the accompanying drawing which shows by way of example and not limitation, the presently preferred embodiment of the invention;

Figure 1:
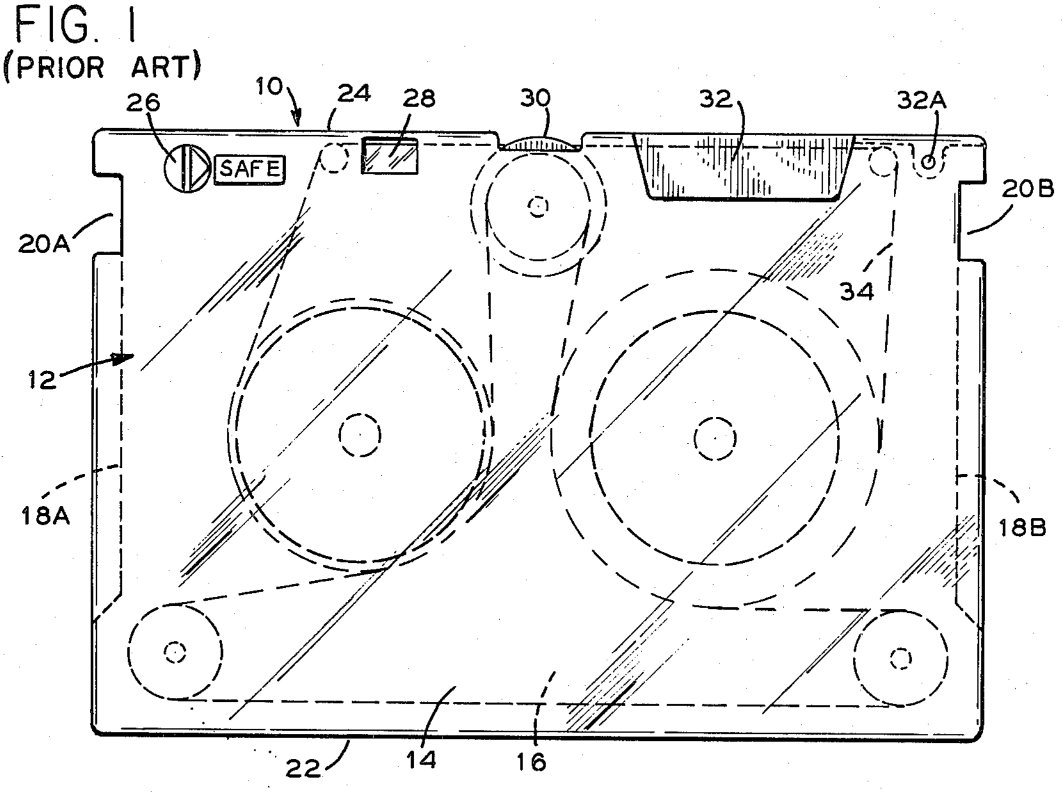
FIG. 1 (PRIOR ART)
FIG. 1 is a plan view of a prior art cartridge.
Figure 2:
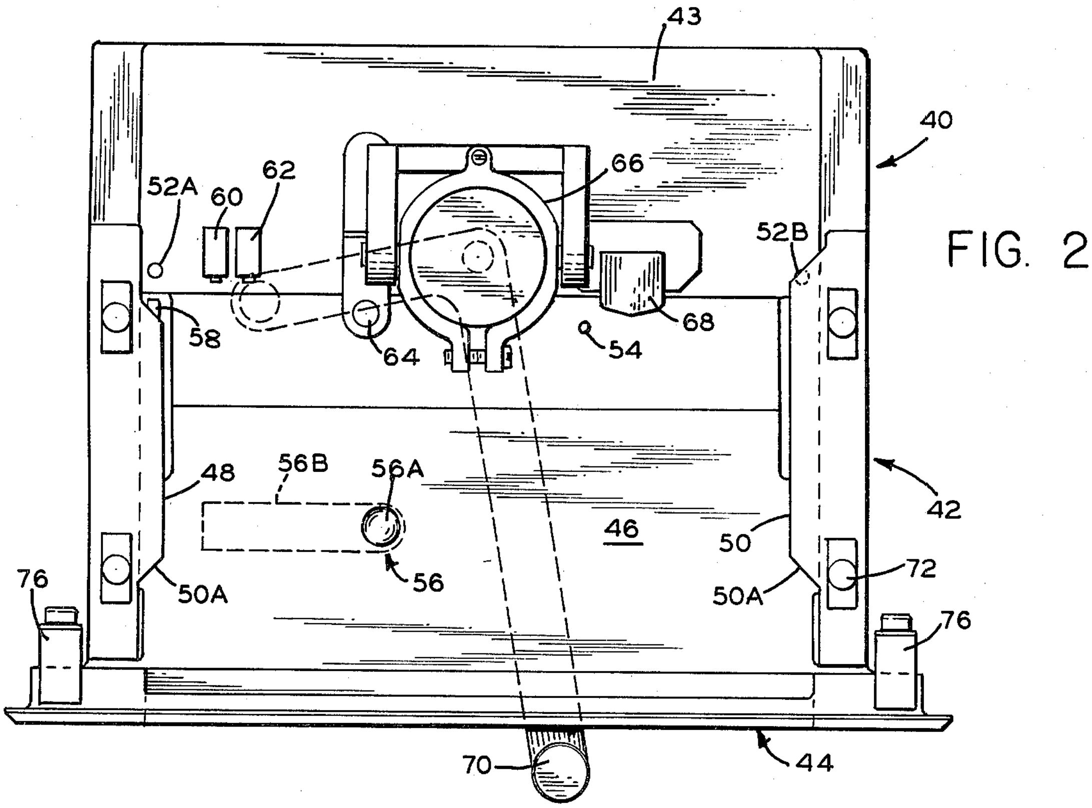
FIG. 2 is a plan view slightly reduced in scale of a deck that accepts the cartridge of FIG. 1.

In FIG. 1, the cartridge 10 has a casing 12 having a top transparent plate 14, a bottom plate 16 visible through plate 14, a pair of side channels 18A, 18B terminating in notches 20A, 20B, near a wall 22 and a far wall 24.

Associated with wall 24, there is shown a manual tape-erase interlock 26, an end-of-tape sensor optic means 28, an exposed driving puck 30 and a tape access door 32, hinged and spring-biased toward closure at a pivot 32A.

Showing through plate 14, a closed-belt drive links puck 30 with the tape spools on which a tape 34 can be traced in its path past door 32, puck 30 and optics 28.

Referring to the figures generally, a deck 40 has a cartridge-accepting assembly 42 to which there is mounted a front-panel 44.

Assembly 42 includes a base structure 43, a bed plate 46 a left guide 48, a right guide 50, a pair of far edge stops 52A, 52B and a third stop 54 in the tape access opening. Plate 46 is provided with a cartridge-life means 56 comprising a ball 56A retained in, but protruding through an opening by a leaf spring 56B. (See FIG. 8 in particular.) By this means the near portion of the cartridge is held positively against the inside lower surfaces of guides 48 and 50.

Figure 9:
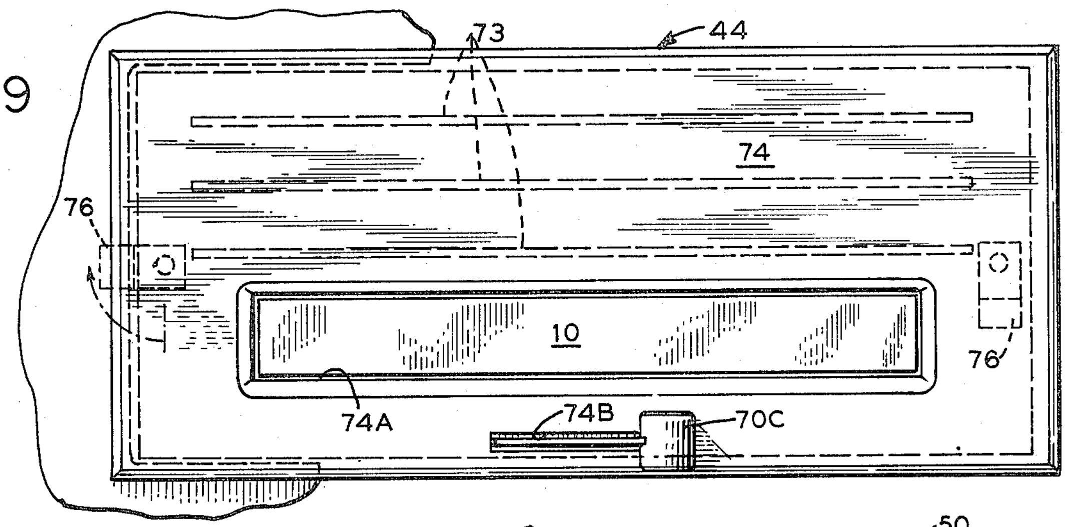
FIG. 9 is a front view of the deck-escutcheon combination mounted to a panel, the cartridge shown in place.

Assembly 42 has further a pair of roller arm assemblies 58, an erase interlock switch 60, a final position switch 62, an end-of-tape sensor 64, a drive motor assembly 66, a magnetic head 68, a cartridge release means 70 and mounts for printed circuit boards 73 see FIG. 9.

Panel 44 comprises an escutcheon 74 having an opening 74A that accepts the cartridge, a second opening 74B for release means 70 and a pair of panel fasteners 76. (See FIG. 9 in particular.)

Figures 4, 5:
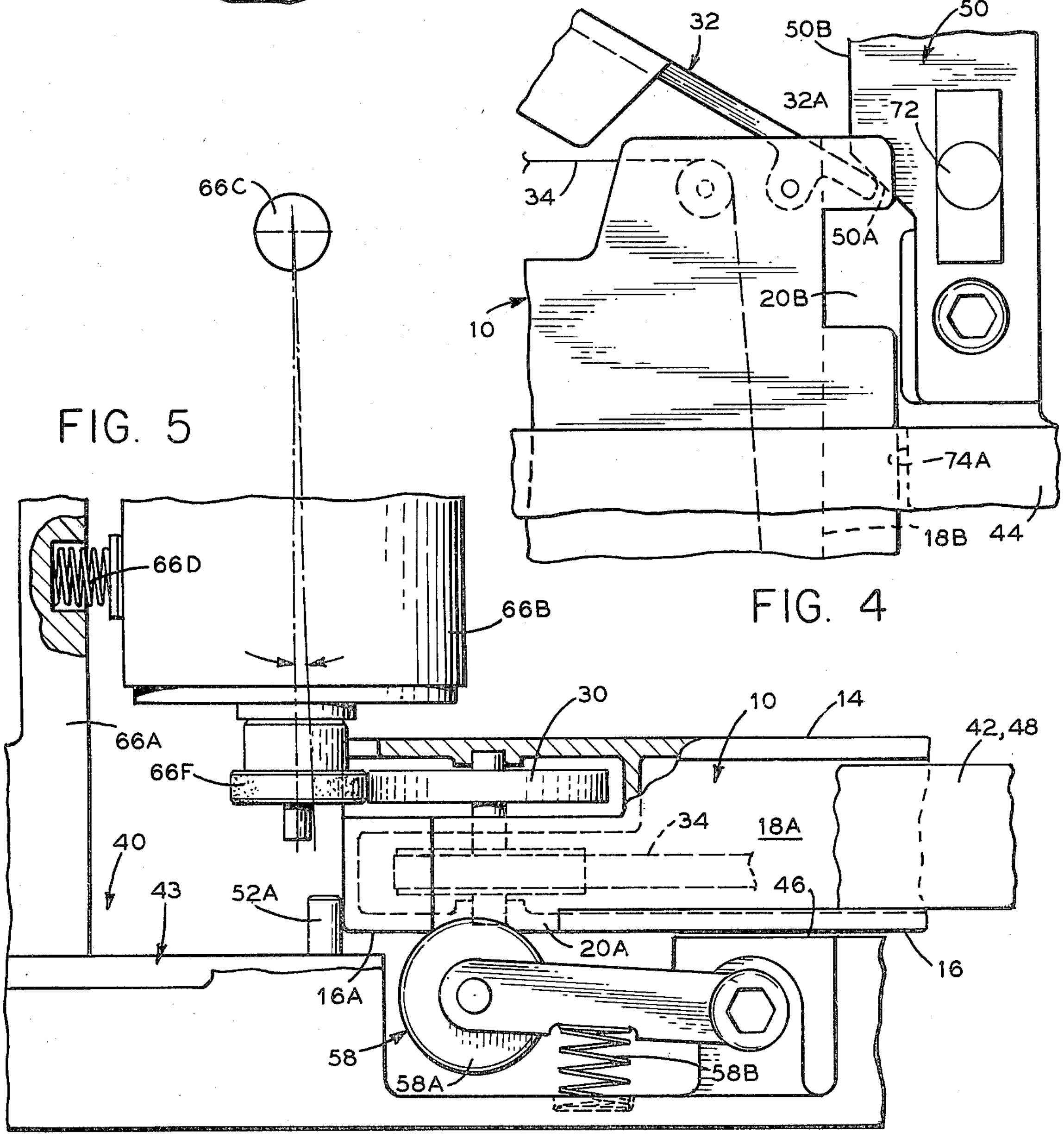
FIG. 4 is a detail view of the tape-access door during cartridge insertion.
FIG. 5 is a side view of the far portions of the deck and the fully inserted cartridge.

In FIG. 4, a camming surface 50A is shown opening door 32 upon first inserting cartridge 10. The straight "rise" 50B maintans the door in the open position.

Referring to FIG. 5, manual pressure on insertion causes the bottom portions 16A of the cartridge 10 to act as cam followers to yield and finally seat into notches 20A, 20B of the cartridge. The force exerted by a pair of springs 58B provided respectively on roller arm assemblies 58 resolves into two components, one urging the cartridge against stops 52A, 52B, and the other upward against the lower inside surfaces of side guides 48, 50. It now becomes evident that a cartridge is positively positioned each time it is inserted.

Figures 3, 6, 7, 8:
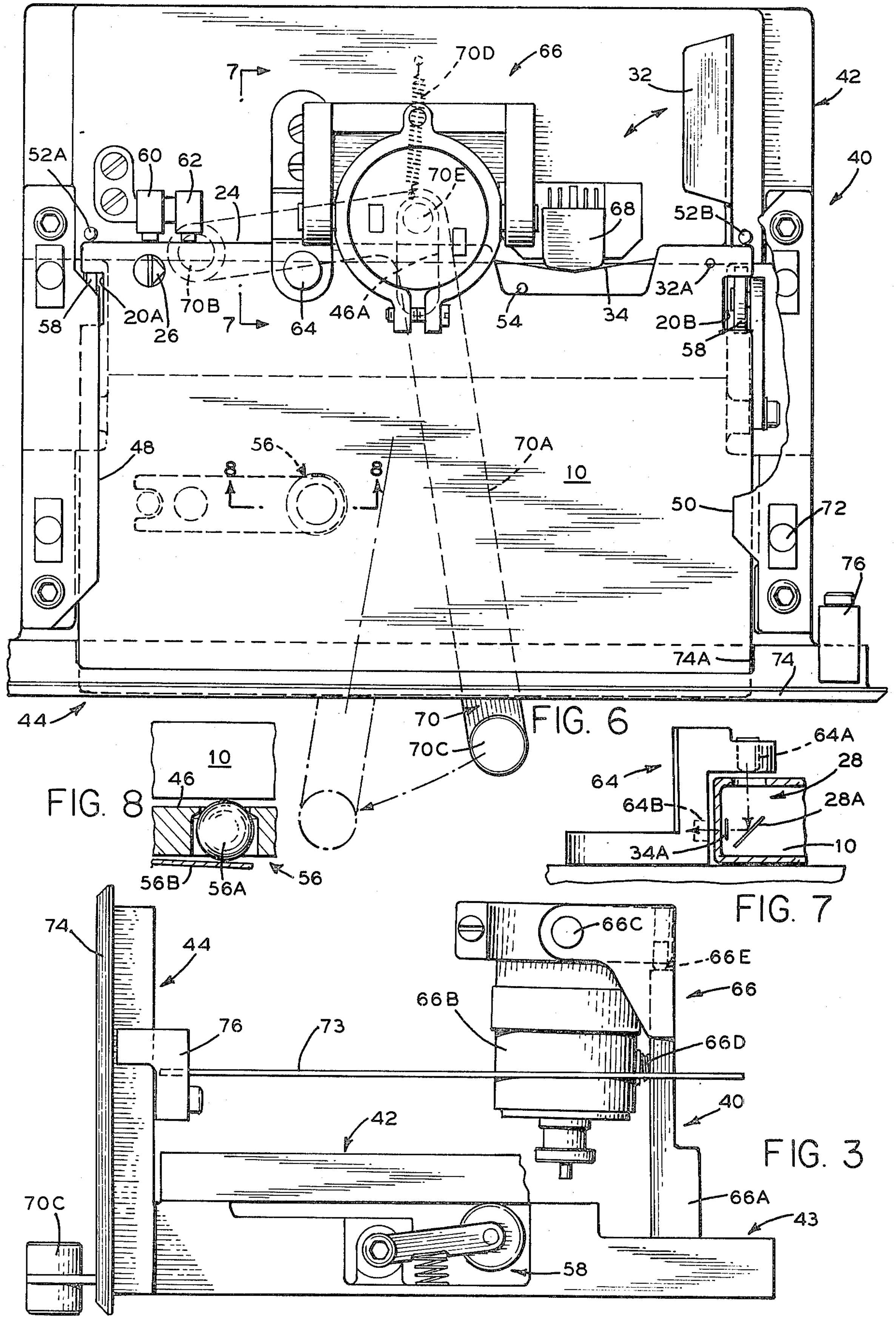
FIG. 3 is a side view thereof.
FIG. 6 is a plan view of the deck and the fully inserted cartridge.
FIG. 7 is a section view taken on the line 7—7 in FIG. 6.
FIG. 8 is a section view taken on line 8—8 in FIG. 6.

Referring to motor assembly 66, the construction shows a support 66A extending upward from the top side of base structure 43, i.e. the side adjacent a cartridge. The support 66 carries a drive motor 66B which is pivotally mounted in a pair of bearings 66C. The motor is biased clockwise, as seen in FIG. 3 and counterclockwise in FIG. 5 by a compression spring 66D, the rest position slightly out of the vertical as determined by the adjustment of a stop 66E. During the final camming action of rollers 58A, springs 56B overcome spring 66D when puck 30 contacts a motor capstan 66F, and the cartridge seats against stops 52A, 52B. The motor turns to a closely-vertical position thereby making for good running contact between the capstan and the puck.

Additionally, in the operative position, switch 60 contacts the door of interlock 26, switch 62 contacts far edge 24, magnetic head 68 engages tape 34 and sensor 64 is in position at optic means 28, as shown in FIG. 7. Referring to the sensor, a lamp 64A passes light down to a 45° mirror 28A where the reflected beam is detected by a photo transistor 64B as soon as a transparent end-of-tape portion 34A reaches the optical path.

Cartridge release means 70 comprises an arm 70A that is pivoted in a bearing 70B and extends to a finger grip 70C. The arm, biased counter-clockwise by a tension spring 70D, has a pin 70E extending through an opening 46A in bed plate 46. Upon turning arm 70A, as indicated by the arrow in FIG. 6, pin 70E, contacts cartridge edge 24. The cartridge, forcibly moving rollers 58A out of notches 20A, 20B, is ejected for easy manual withdrawal.

While a preferred embodiment of the deck has been illustrated and described, it should be observed that omissions changes and/or additions may be made in such embodiment without departing from the spirit and scope of the invention.

For example, guides, stops, spring biasing, eject means, may vary in construction or location, the deck may omit the panel-mount means, the PC boards and other electronics may be arranged in various ways or may be absent entirely by being located remotely and tied in by cable, chassis, plug-in means or the like.

What is claimed is:

1. A deck for a cartridge having a tape mounted on two reels which are driven to rotate by the rotation of a drive puck located at the front end of the cartridge, said deck comprising a magnetic head, a base structure and a bed plate assembly, a pair of side guides on said bed plate, each of said guides having a side wall and a top wall for cooperating with said bed plate to guide a cartridge into an operative position with respect to said magnetic head, a motor support means extending upward from the top surface of the base structure nearest a loaded cartridge, a drive motor, a capstan on the shaft of said drive motor, means for pivotably mounting said drive motor on said support means to extend downwardly toward said surface of said base structure and bed plate so that said capstan will be opposite the drive puck of a loaded cartridge and biasing means for urging said drive motor to pivot toward a loaded cartridge whereby said capstan is in forced contact with the drive puck of a loaded cartridge.

2. The deck of claim 1 wherein the cartridge is provided with a notch in each of its side walls near the front end of the cartridge for acceptance by said side guides, said deck further comprising stop means near one end of the bed plate for engaging the front end of a loaded cartridge, two roller means, each of said roller means being pivotably mounted in said base structure and bed plate assembly in the region of said side guides, means for biasing said roller means to pivot upward from the top surface of said bed plate, the diameter of said roller means being greater than the length of said notches so that said roller means engage the notches in the side walls of a loaded cartridge to urge it simultaneously against said stop means and against the lower walls of said side guides.

3. The deck of claim 2 further comprising a ball mounted in said bed plate remote from said one end and extending beyond the top surface of said bed plate, and means for upwardly biasing said ball for urging a loaded cartridge against the lower walls of said side guides.

4. The deck of claim 2 further comprising a release lever pivotably connected to the bottom surface of said base structure and bed plate assembly, said assembly being provided with a slot in the region of said one end and a finger extending upward through said slot for engaging the front end of a loaded cartridge so that a pivoting of said release lever retracts such loaded cartridge to the point where said roller means disengage from the notches of the loaded cartridge.

5. The deck of claim 1 further comprising at least one printed circuit board having a cut out region, and means for mounting said printed circuit board above the top surface of said base structure and bed plate assembly such that said motor support means occupies the cut out region of said printed circuit board.

6. A deck for a cartridge having a tape mounted on two reels which are driven to rotate by the rotation of a drive puck located at the front end of the cartridge and having side walls, each provided with a notch, said deck comprising a magnetic head, a bed plate, a pair of side guides on said bed plate each of said side guides having a side wall and a lower wall for cooperating with said bed plate for the accepting of the side walls of the cartridge for guiding the front end thereof into an operative position with respect to said magnetic head, stop means near one end of said bed plate for engaging the front end of a loaded cartridge, two roller means, each of said roller means being pivotably mounted in said bed plate in the region of said side guides, near said one end of said bed plate, means for biasing said roller means to pivot upward from the top surface of said bed plate, the diameter of said roller means being greater than the length of said notches so that said roller means engage the notches in the side walls of a loaded cartridge to urge it simultaneously against said stop means and against the lower walls of said side guides, and means for rotating said drive puck.

7. The deck of claim 6 further comprising a ball mounted in said bed plate remote from said one end and extending beyond the top surface of said bed plate, and means for upwardly biasing said ball for urging a loaded cartridge against the lower walls of said side guides.

8. The deck of claim 6 further comprising a release lever pivotably connected to the bottom surface of said bed plate, said bed plate being provided with a slot in the region of said one end and a finger extending upward through said slot for engaging the front end of a loaded cartridge so that a pivoting of said release lever retracts such a loaded cartridge to the point where said roller means disengage from the notches of the loaded cartridge.

9. The deck of claim 6 further comprising an escutcheon connected to the other end of said bed plate, said escutcheon being provided with a first opening for receiving a cartridge.

10. The deck of claim 9, further comprising mounting lugs on the rear surface of said escutcheon.

* * * * *